(12) United States Patent
Kato et al.

(10) Patent No.: US 8,598,506 B2
(45) Date of Patent: Dec. 3, 2013

(54) SOLID-STATE IMAGE PICKUP APPARATUS AND DRIVING METHOD THEREFOR

(75) Inventors: Satoshi Kato, Kawasaki (JP); Yukihiro Kuroda, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 13/032,868

(22) Filed: Feb. 23, 2011

(65) Prior Publication Data

US 2011/0204977 A1 Aug. 25, 2011

(30) Foreign Application Priority Data

Feb. 24, 2010 (JP) ................................. 2010-039070

(51) Int. Cl.
*H03F 3/08* (2006.01)
*H03F 3/45* (2006.01)
*H03F 3/04* (2006.01)
*H01J 43/00* (2006.01)
*H01J 40/14* (2006.01)
*H03K 17/78* (2006.01)
*H03K 4/02* (2006.01)
*H04N 3/14* (2006.01)

(52) U.S. Cl.
USPC .......... 250/214 A; 250/214 LA; 250/214 SW; 250/214 R; 330/261; 330/296; 348/300; 348/308; 327/51; 327/127

(58) Field of Classification Search
USPC ................ 250/214 R, 214.1, 214 A, 214 LA, 250/214 SW; 330/69, 123, 252, 261, 296, 330/310; 348/300–302, 308–313
See application file for complete search history.

(56) References Cited

U.S. PATENT DOCUMENTS

| | | | |
|---|---|---|---|
| 6,897,429 B1 | 5/2005 | Turner | |
| 7,741,593 B2 | 6/2010 | Iwata | |
| 7,817,199 B2 | 10/2010 | Yamashita | |
| 2004/0080637 A1 | 4/2004 | Nakamura | |
| 2006/0278809 A1 | 12/2006 | Takayanagi | |
| 2010/0020217 A1* | 1/2010 | Abe et al. ...................... | 348/308 |

FOREIGN PATENT DOCUMENTS

| | | |
|---|---|---|
| EP | 1115244 A2 | 7/2001 |
| JP | 2005-354484 A | 12/2005 |
| JP | 2006-109530 A | 4/2006 |
| JP | 2008-067344 A | 3/2008 |
| JP | 2008-136239 A | 6/2008 |
| JP | 2008-160344 A | 7/2008 |
| JP | 2009-194569 A | 8/2009 |

* cited by examiner

*Primary Examiner* — Kevin Pyo
*Assistant Examiner* — Don Williams
(74) *Attorney, Agent, or Firm* — Canon U.S.A., Inc. IP Division

(57) ABSTRACT

An apparatus according to an embodiment of the present invention includes a conversion unit configured to generate electric charge, a first amplification unit configured to amplify a signal corresponding to an amount of the electric charge and output a first amplified signal, a second amplification unit configured to amplify the first amplified signal and output a second amplified signal, a current source shared by the first amplification unit and the second amplification unit, and a selection unit configured to bring the first amplification unit and the second amplification unit into an inactive state. The current source is shared by the first amplification unit and the second amplification unit. The number of current sources is therefore reduced. This leads to the reduction in power consumption.

20 Claims, 12 Drawing Sheets

SOLID-STATE IMAGE PICKUP APPARATUS AND DRIVING METHOD THEREFOR

BACKGROUND OF THE INVENTION

1. Field of the Invention

The present invention relates to a solid-state image pickup apparatus, and, more particularly, to a technique for reducing the power consumption of a solid-state image pickup apparatus.

2. Description of the Related Art

Solid-state image pickup apparatuses in which a signal generated by a photoelectric conversion unit is amplified by a plurality of amplification stages have been recently proposed. Japanese Patent Laid-Open No. 2006-109530 discloses a photoelectric conversion apparatus including a first amplification stage in a photoelectric conversion unit and a second amplification stage in a signal storage unit (see, FIG. 1.)

However, since two amplification stages individually have current sources in the photoelectric conversion apparatus, there is room for improvement from the viewpoint of power consumption. When more than two amplification stages are disposed, power consumption is further increased.

In addition, in order to increase a signal reading speed, techniques for reading out signals from a plurality of pixels in parallel and amplifying them have been proposed. When a plurality of reading paths used to process signals in parallel are individually provided with a plurality of amplification stages, power consumption is increased in accordance with the number of reading circuits. For example, in solid-state image pickup apparatuses for copiers, scanners, and single-lens reflex cameras, thousands of reading paths may be disposed in parallel. In this case, power consumption is markedly increased.

SUMMARY OF THE INVENTION

An apparatus according to an embodiment of the present invention includes a conversion unit configured to generate electric charge, a first amplification unit configured to amplify a signal corresponding to an amount of the electric charge and output a first amplified signal, a second amplification unit configured to amplify the first amplified signal and output a second amplified signal, a current source shared by the first amplification unit and the second amplification unit, and a selection unit configured to separately bring the first amplification unit and the second amplification unit into an inactive state.

Further features of the present invention will become apparent from the following description of exemplary embodiments with reference to the attached drawings.

DESCRIPTION OF THE EMBODIMENTS

Embodiments of the present invention will be described with reference to the accompanying drawings.

First Embodiment

Figure 1:
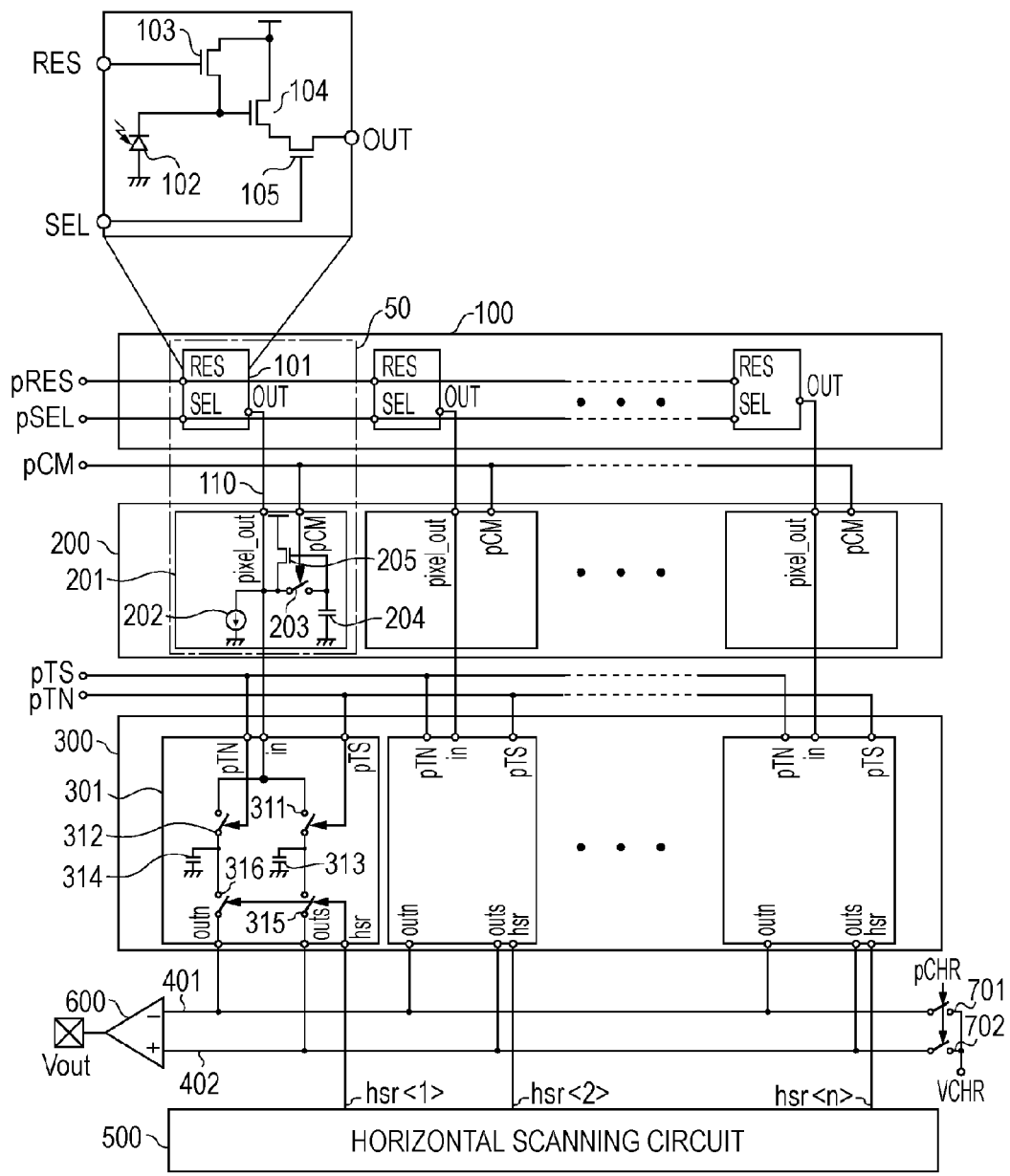
FIG. 1 is a schematic diagram of a system according to a first embodiment of the present invention.

FIG. 1 is a block diagram of a system according to the first embodiment. A pixel array 100 includes N pixels 101 that are one-dimensionally arranged. Each of the pixels 101 includes a photodiode (PD) 102, a reset transistor (Tr) 103, a first amplification transistor (Tr) 104, and a selection transistor (Tr) 105. In this embodiment, each transistor is an NMOS transistor. Each transistor may be a PMOS transistor or a bipolar transistor as appropriate.

The PD 102 is a photoelectric conversion unit for photo-electrically converting incident light into a signal electric charge. The gate of the first amplification Tr 104 is electrically connected to the PD 102. The drain of the first amplification Tr 104 is connected to a power line. The source of the first amplification Tr 104 is electrically connected to an output signal line 110 via the selection Tr 105. The first amplification Tr 104 and a current source 202 to be described later form a first source follower circuit. The gate of the first amplification Tr 104 is an input node of the first source follower circuit. The reset Tr 103 resets the PD 102 and the input node of the first source follower circuit. A node RES is connected to the gate of the reset Tr 103, and a reset pulse pRES is input into the reset Tr 103. The operation of the reset Tr 103 is controlled by the reset pulse pRES.

The first source follower circuit amplifies a signal corresponding to the amount of signal electric charge generated by the photoelectric conversion unit and outputs the amplified signal. In this specification, a signal corresponding to the amount of signal electric charge generated by a photoelectric conversion unit and a signal obtained by causing an amplification unit to amplify the signal are referred to as photoelectric conversion signals. In this embodiment, a photoelectric conversion signal output from the first source follower circuit corresponds to a first amplified signal according to an embodiment of the present invention.

The first source follower circuit can output a pixel noise signal in a state in which the voltage of the input node thereof is reset to a reset voltage. In this specification, a signal corresponding to the voltage of an input node in a state in which the voltage of the input node is reset and a signal obtained by causing an amplification unit to amplify the signal are referred to as noise signals. The state in which the voltage of an input node is reset includes a sate in which the reset Tr 103 connected to the input node is conducting and a state in which noise caused by turning off of the reset Tr 103 is superimposed. After the reset Tr 103 has been turned off, the voltage of the input node may be changed by an electric charge generated by photoelectric conversion. Even in this case, a state on the basis of which the difference between a photoelectric conversion signal and a noise signal is computed may be reset. A state immediately after the reset Tr 103 has been turned off is a reset state. In this embodiment, a noise signal output from the first source follower circuit corresponds to a third amplified signal according to an embodiment of the present invention. A signal output from the pixel 101 is output from an output node OUT and is then input into a circuit at a subsequent stage via the output signal line 110.

The selection Tr 105 switches between an active state and an inactive state of the first source follower circuit. A node SEL is connected to the gate of the selection Tr 105, and a selection pulse pSEL is input into the selection Tr 105. The operation of the selection Tr 105 is controlled by the selection pulse pSEL.

A column circuit block array 200 includes a plurality of column circuit blocks 201 that are individually connected to the output signal lines 110. The column circuit block array 200 is configured to process signals output from a plurality of pixels in parallel. Each of the column circuit blocks 201 includes the current source 202, a sample-and-hold (S/H) switch 203, an intermediate capacitor 204, and a second amplification transistor (Tr) 205.

The second amplification Tr 205 and the current source 202 form a second source follower circuit. The second source follower circuit amplifies a photoelectric conversion signal output from the first source follower circuit and outputs the amplified signal. A photoelectric conversion signal output from the second source follower circuit corresponds to a second amplified signal according to an embodiment of the present invention. In addition, the second source follower circuit may amplify a pixel noise signal and output the amplified pixel noise signal. A noise signal output from the second source follower circuit corresponds to a fourth amplified signal according to an embodiment of the present invention.

The S/H switch 203 is disposed on a path between the output node OUT of the pixel 101, which is the output node of the first source follower circuit, and the gate of the second amplification Tr 205, which is the input node of the second source follower circuit. The S/H switch 203 may be disposed to directly connect the output node OUT and the gate of the second amplification Tr 205 or to connect the output node OUT and the gate of second amplification Tr 205 via another circuit element. The S/H switch 203 is switched between an ON state and an OFF state by an S/H pulse input into a node pCM. The S/H switch 203 controls the electric connection between the output node of the first source follower circuit and the input node of the second source follower circuit.

The intermediate capacitor 204 is disposed as appropriate, and is used to temporarily store a photoelectric conversion signal output from the first source follower circuit. The intermediate capacitor is formed of a capacitance element in this embodiment, but may be formed of a parasitic capacitor between lines. The intermediate capacitor 204 may store a noise signal output from the first source follower circuit.

The current source 202 is a load for supplying a driving current for an amplification circuit, and is formed of a transistor or the like. The first amplification Tr 104 and the second amplification Tr 205 share the current source 202 with each other so as to form the first source follower circuit and the second source follower circuit, respectively. As will be described in detail later, in this embodiment, the selection Tr 105 switches between the active state and the inactive state of the first source follower circuit, and the S/H switch 203 switches between the active state and the inactive state of the second source follower circuit. The selection Tr 105 and the S/H switch 203 correspond to a selection unit according to an embodiment of the present invention.

In general, amplification circuits include at least one transistor and a bias supply for supplying a bias current or a bias voltage to the transistor. Examples of a bias supply for supplying a bias current include a current source. As a method of bringing an amplification circuit into an inactive state, a method of controlling the bias state of a transistor included in the amplification circuit so that the transistor is turned off or a method of electrically disconnecting the amplification circuit with a switch disposed in the amplification circuit can be considered. For example, it is possible to bring an amplification circuit into an inactive state by interrupting the path between a transistor and a bias supply with a switch.

A selection unit according to this embodiment can bring the second source follower circuit into the inactive state when the first source follower circuit is in the active state, and can bring the first source follower circuit into the inactive state when the second source follower circuit in the active state.

The selection unit may bring both the first source follower circuit and the source follower circuit into the inactive state at the same time. For example, the selection unit can bring the first source follower circuit and the source follower circuit into the inactive state by bringing the selection Tr 105 into the non-conductive state and bringing the S/H switch 203 into the conductive state.

Each of the selection Tr 105 and the S/H switch 203 transitionally switches between the conductive state and the non-conductive state. Accordingly, during a period of transition, it may not be determined which of the first source follower circuit and the second source follower circuit is in the inactive state or both the first source follower circuit and the second source follower may be in the active state. The selection unit may have a configuration capable of bringing a first amplification unit and a second amplification unit in the above-described state.

A storage unit 301 for storing a photoelectric conversion signal and a noise signal is disposed for each of the output signal lines 110 as appropriate. A memory array 300 includes the storage units 301. The storage unit 301 includes a storage capacitor (Cts) 313 for storing a photoelectric conversion signal, a storage capacitor (Ctn) 314 for storing a noise signal, a Ct control switch 311 for controlling sampling of a signal in the Cts 313, a Ct control switch 312 for controlling sampling of a signal in the Ctn 314, a horizontal scanning switch 315 for controlling output of a signal to a horizontal output line 402, and a horizontal scanning switch 316 for controlling output of a signal to a horizontal output line 401. The Ct control switches 311 and 312 are controlled by control signals pTS and pTN, respectively. The horizontal scanning switches 315 and 316 are controlled by a horizontal scanning signal hsr<1>, . . . , or hsr<n>(n represents a column number) generated by a horizontal scanning circuit 500.

At a subsequent stage of the horizontal output lines 401 and 402, an output amplifier 600 for outputting the difference between a signal output to the horizontal output line 401 and a signal output to the horizontal output line 402 is disposed as appropriate. By outputting the difference between a noise signal and a photoelectric conversion signal containing a noise component correlated with noise of a pixel, it is possible to obtain a signal corresponding to a net amount of electric charge generated by photoelectric conversion.

Figure 2:
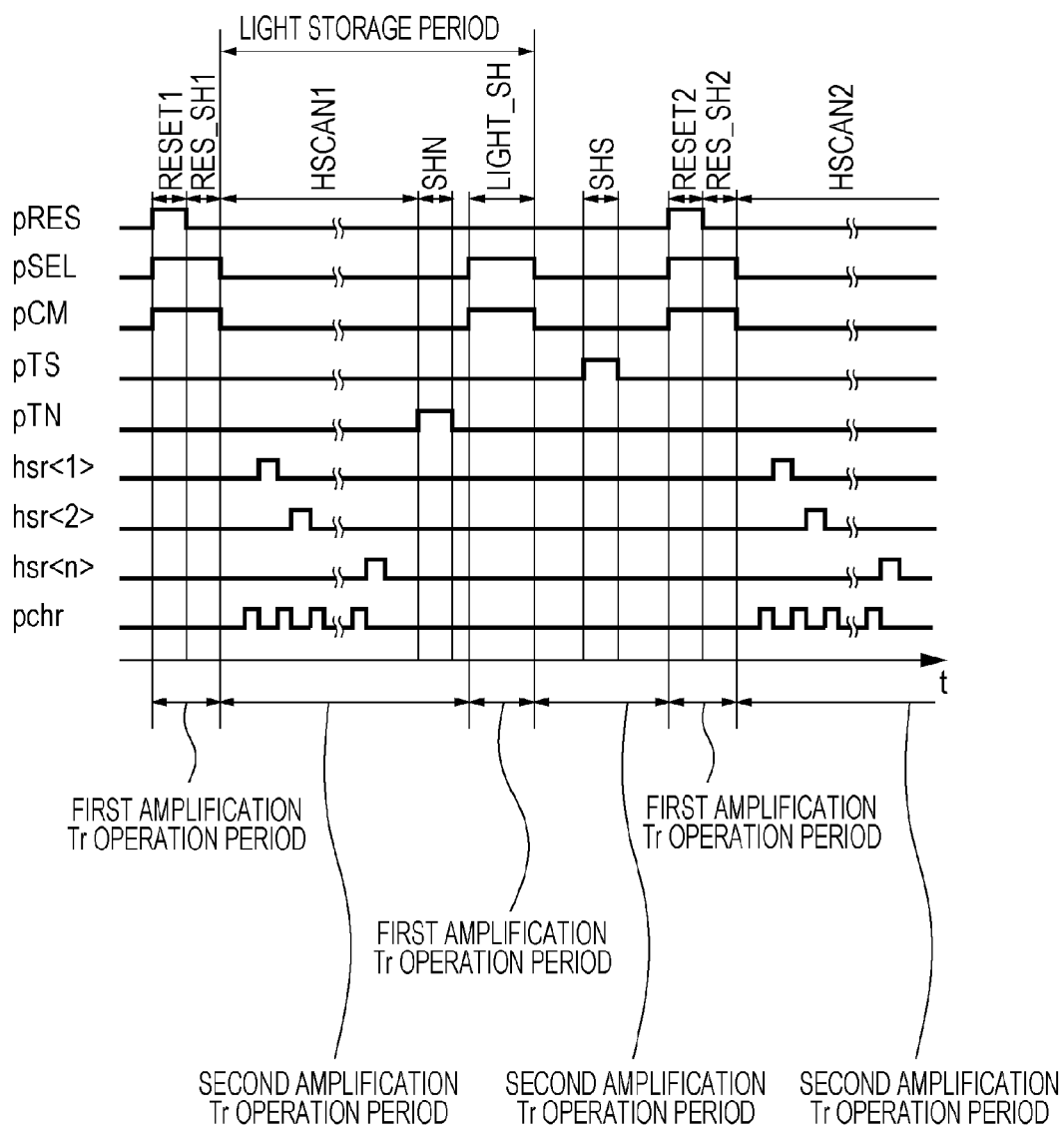
FIG. 2 is a timing chart illustrating the operation of a solid-state image pickup apparatus illustrated in FIG. 1.

FIG. 2 is a timing chart illustrating the operation of the circuit illustrated in FIG. 1. Pulses with the same reference numeral in FIGS. 1 and 2 correspond to each other. Referring to FIG. 2, a horizontal axis represents a time. The operation of the system illustrated in FIG. 1 will be described in detail with reference to the timing chart illustrated in FIG. 2. When each pulse is at a high level, a corresponding switch is turned on. It is assumed that a signal that has been obtained in the last storage period is stored in the storage unit 301.

In a period RESET1, pulses of levels at which switches corresponding to the nodes RES, SEL, and pCM are turned on are input into the nodes RES, SEL, and pCM, respectively. The reset Tr 103 is brought into the conductive state after the pulse has been input into the node RES, so that the potential of the PD 102 and the potential of the gate of the first amplification Tr 104, that is, the potential of the input node of the first source follower circuit, are reset.

Figure 5A:
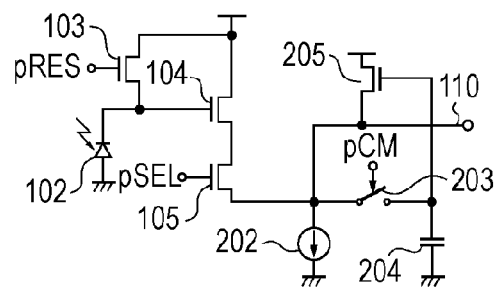
FIG. 5A is a circuit diagram of a circuit block illustrated in FIG. 1.
Figure 5B:
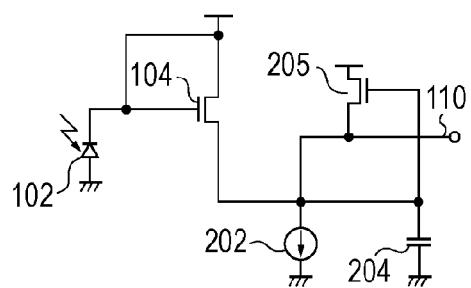
FIGS. 5B to 5D are diagrams illustrating connection states of the circuit block illustrated in FIG. 1.

FIG. 5A is a diagram illustrating a circuit in a region 50 surrounded by alternate long and short dashed lines in FIG. 1. FIG. 5B is a diagram illustrating the connection state of the circuit illustrated in FIG. 5A in the period RESET1. Referring to FIG. 5B, when a switch or a transistor functioning as a switch is in the ON state (conductive state), two nodes, which are connected to each other by the switch or the transistor, are short-circuited with a solid line. When a switch or a transistor functioning as a switch is in the OFF state (non-conductive state), there is no solid line between two nodes that are connected to each other by the switch or the transistor. Thus, in FIG. 5B and other drawings, the representation of a circuit is simplified.

Referring to FIG. 5B, the gate voltage and the source voltage of the second amplification Tr 205 are the same. Accordingly, the second amplification Tr 205 is in the OFF state and does not affect the output of a pixel. That is, the second source follower circuit does not perform an amplification operation and is in the inactive state. On the other hand, the first source follower circuit including the first amplification Tr 104 is in the active state. The first source follower circuit amplifies a signal corresponding to a reset voltage applied to the gate of the first amplification Tr 104, which it the input portion of the first source follower circuit, and outputs the amplified signal to the output signal line 110.

In a period RES_SH1 illustrated in FIG. 2, a pulse of a level at which the reset Tr 103 is turned off is input into the node RES. Turning off of the reset Tr 103 generates a noise component and the noise component is superimposed on a reset voltage. A noise signal output from the first source follower circuit is sampled in the intermediate capacitor 204. In this embodiment, after the period RES_SH1 has elapsed, a light storage period is started.

Figure 5C:
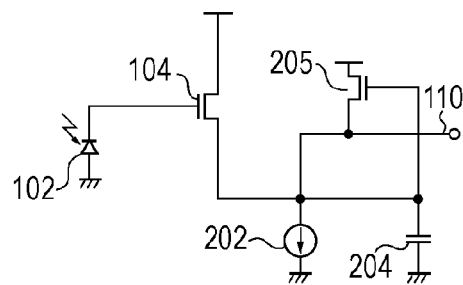

FIG. 5C illustrates the connection state of the circuit illustrated in FIG. 5A in the period RES_SH1. In this period, the first source follower circuit is also in the active state, and the second source follower circuit is also in the inactive state.

In a period HSCAN1, pulses of levels at which switches corresponding to the nodes SEL and pCM are turned off are input into the nodes SEL and pCM, respectively. In this period, a photoelectric conversion signal and a noise signal, which have been stored in the Cts 313 and the Ctn 314, respectively, in the last light storage period, are externally output from the output amplifier 600 via the horizontal output lines 402 and 401, respectively, in response to the horizontal scanning signal hsr<1>, . . . , or hsr<n>.

Figure 5D:
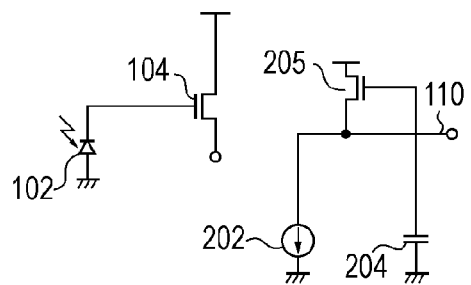

FIG. 5D is a diagram illustrating the connection state of the circuit illustrated in FIG. 5A in the period HSCAN1. Referring to FIG. 5D, the S/H switch 203 is in the OFF state, and the source and the gate of the second amplification Tr 205 are not connected. Here, by setting the level of a signal amplified by the first source follower circuit to a level at which the second amplification Tr 205 can operate in a saturation region, the second amplification Tr 205 is turned on. That is, the second source follower circuit is brought into the active state, receives the noise signal stored in the intermediate capacitor 204, amplifies the noise signal, and outputs the amplified noise signal to the output signal line 110. On the other hand, the first source follower circuit is in the inactive state since the selection Tr 105 electrically disconnects the first amplification Tr 104 from the current source 202.

In a period SHN, a pulse of a level at which the Ct control switch 312 is turned on is input into a node pTN. In this period, the connection state of the circuit illustrated in FIG. 5A is as illustrated in FIG. 5D. The second source follower circuit including the second amplification Tr 205 and the current source 202 amplifies the noise signal stored in the intermediate capacitor 204 and samples the amplified signal in the Ctn 314.

After the noise signal has been sampled in the Ctn 314, pulses of levels at which switches corresponding to the nodes SEL and pCM are turned on are input into the nodes SEL and pCM, respectively. In a period LIGHT_SH, like in the period RES_SH1, the connection state of the circuit illustrated in FIG. 5A is as illustrated in FIG. 5C. That is, the second source follower circuit is in the inactive state, and the first source follower circuit is in the active state. A photoelectric conversion signal amplified by the first source follower circuit is sampled in the intermediate capacitor 204. After the period LIGHT_SH has elapsed, the light storage period ends.

In a period SHS, pulses of levels at which switches corresponding to the nodes SEL and pCM are turned off are input into the nodes SEL and pCM, respectively, and a pulse of a level at which the Ct control switch 311 is turned on is input into a node pTS. At that time, the connection state of the circuit illustrated in FIG. 5A is as illustrated in FIG. 5D. That is, the second source follower circuit is in the active state, and the photoelectric conversion signal is sampled in the Cts 313.

In periods RESET2 and RES_SH2, a reset operation and a noise signal sampling operation are performed. In a period HSCAN2, the photoelectric conversion signal sampled in the Cts 313 and the noise signal sampled in the Ctn 314 are read out.

A pulse input into the node pSEL and a pulse input into the node pCM can be separately controlled. Accordingly, the switching between the active state and the inactive state of each of the first source follower circuit and the second source follower circuit can be controlled regardless of the conductive state of the other source follower circuit. Such control can be achieved with a control pulse transmitted from a timing generator disposed in a solid-state image pickup apparatus or a control pulse externally transmitted from a CPU or the like.

As described previously, in this embodiment, when sampling processing is performed on a capacitor such as the intermediate capacitor 204, the Cts 313, or the Ctn 314, either the first source follower circuit or the second source follower circuit is in the active state. In particular, when an amplified signal is sampled in a signal storage unit (the intermediate capacitor 204 or the storage unit 301) disposed at a stage subsequent to each of source follower circuits, both of these source follower circuits are not in the active state. As a result, it is possible for the first amplification Tr 104 and the second amplification Tr 205 to share the current source 202 without increasing power consumption. According to this embodiment, as compared with the related art, the number of current sources can be reduced. This leads to the reduction in power consumption.

In this embodiment, the number of required elements may be reduced by achieving the sharing of a current source. This leads to the size reduction of a solid-state image pickup element.

In this embodiment, the output node of the first source follower circuit and the output node of the second source follower circuit are connected to the output signal line 110. The output signal line 110 is connected to the current source 202. Using this configuration, it is possible to reduce the number of lines in circuits. This leads to the size reduction of a solid-state image pickup element.

In this embodiment, the storage unit 301 includes the Cts 313 and the Ctn 314. Using this configuration, a photoelectric conversion signal can be stored in the Cts 313, a noise signal can be stored in the Ctn 314, and the difference between the photoelectric conversion signal and the noise signal can be output from the output amplifier 600. It is therefore possible to reduce noise cause by variations of characteristics of transistors in a pixel.

In this embodiment, instead of a noise signal and a photoelectric conversion signal, signals correlated with each other with regard to pixel resetting may be input into the output amplifier 600. Since the output amplifier 600 outputs the difference between these signals, pixel resetting noise included in a signal output from the output amplifier 600 is reduced. Using this configuration, it is possible to capture a high-quality and low-noise image.

In this embodiment, the selection Tr 105 is connected to the first amplification Tr 104 and the output signal line 110. However, for example, the selection Tr 105 may be connected to a path between a power supply line and the drain of the first amplification Tr 104.

Power supply voltages for the first source follower circuit and the second source follower circuit are not necessarily the same, and may differ from each other so as to allow these circuits to efficiently perform operations in operation ranges.

In this embodiment, the pixel 101 may have a floating diffusion (FD) unit at a node between the PD 102 and the first amplification Tr 104. In this embodiment, the configuration of a reading circuit disposed at a stage subsequent to a line memory is not limited to the configuration illustrated in FIG. 1. For example, at a stage subsequent to the column circuit block array 200, an amplification circuit such as a switched capacitor amplifier or an analog-to-digital converter (ADC) may be disposed.

Second Embodiment

Figure 3:
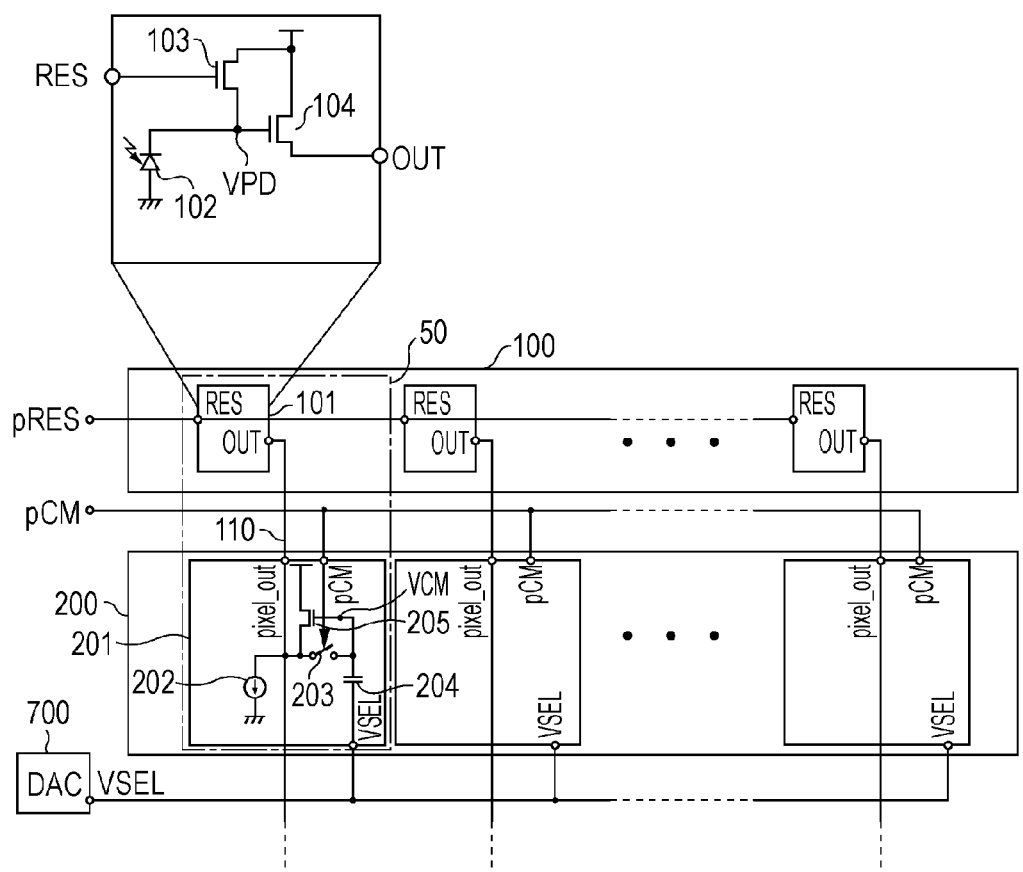
FIG. 3 is a schematic diagram of a system according to a second embodiment of the present invention.

FIG. 3 is a block diagram of a system according to the second embodiment. The same reference numerals are used to identify parts already described in the first embodiment, and the description thereof will be therefore omitted. The difference between the first embodiment and the second embodiment will be described.

In this embodiment, the pixel 101 includes the PD 102, the reset Tr 103, and the first amplification Tr 104 that is included in a first source follower circuit. The difference between the second embodiment and the first embodiment is that the pixel 101 does not include the selection Tr 105.

The column circuit block 201 includes the current source 202, the S/H switch 203, the intermediate capacitor 204, and the second amplification Tr 205. One terminal of the intermediate capacitor 204 is connected to a path between the S/H switch 203 and the gate of the second amplification Tr 205, and the other terminal of the intermediate capacitor 204 is connected to a node VSEL. A reference potential generated by a digital-to-analog converter (DAC) 700 is input into the node VSEL. In this embodiment, the sizes of the first amplification Tr 104 and the second amplification Tr 205 are the same.

A circuit at a stage subsequent to the column circuit block array 200 is not illustrated in FIG. 3. A circuit similar to that according to the first embodiment or a circuit in the related art may be disposed at a stage subsequent to the column circuit block array 200.

As will be described in detail later, the DAC 700 brings the first source follower circuit into the inactive state, and the S/H switch 203 brings the second source follower circuit into the inactive state. In this embodiment, the S/H switch 203 and the DAC 700 correspond to a selection unit according to an embodiment of the present invention.

Figure 4:
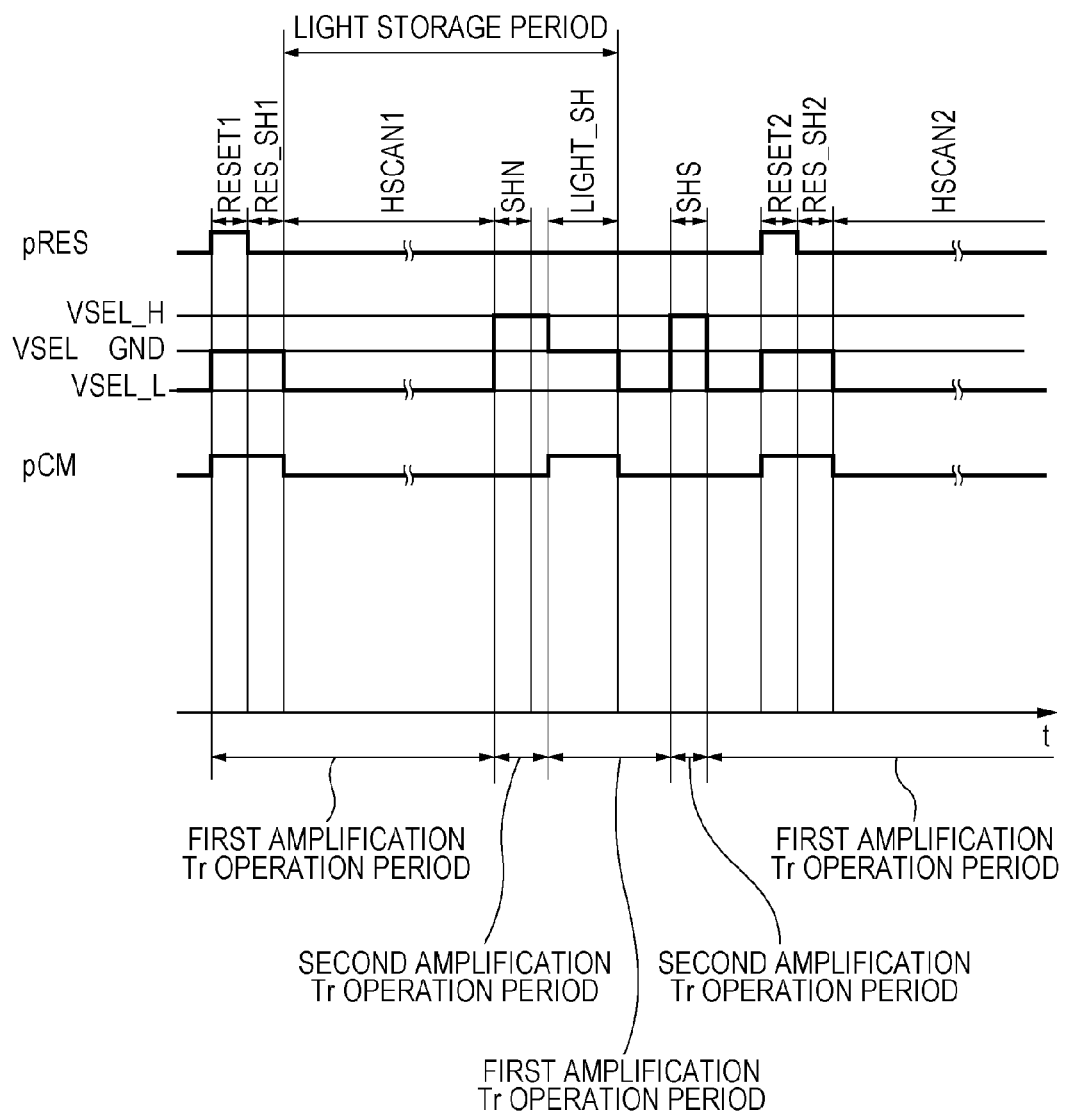
FIG. 4 is a timing chart illustrating the operation of a solid-state image pickup apparatus illustrated in FIG. 3.

FIG. 4 is a timing chart illustrating the operation of the circuit illustrated in FIG. 3. The operation of the circuit illustrated in FIG. 3 will be described in detail with reference to the timing chart illustrated in FIG. 4.

Figure 6A:
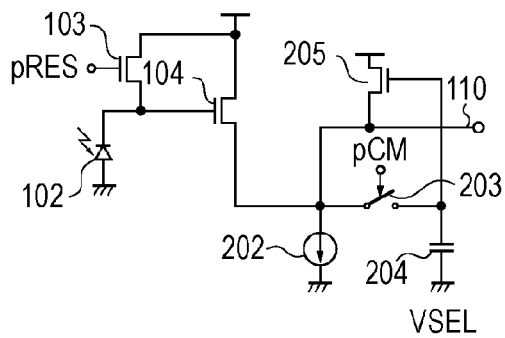
FIG. 6A is a circuit diagram of the circuit block illustrated in FIG. 3.
Figure 6B:
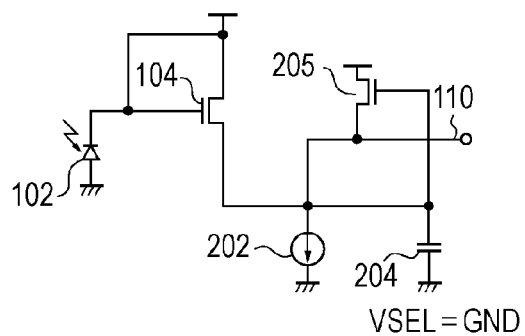
FIGS. 6B to 6E are diagrams illustrating connection states of a circuit block illustrated in FIG. 3.

Referring to FIG. 4, in a period RESET1, the PD 102 is reset. FIG. 6A is a diagram illustrating a circuit in the region 50 surrounded by alternate long and short dashed lines in FIG. 3. In the period RESET1, the connection state of the circuit illustrated in FIG. 6A is as illustrated in FIG. 6B. Referring to FIG. 6B, when a switch or a transistor functioning as a switch is in the ON state (conductive state), two nodes, which are connected to each other by the switch or the transistor, are short-circuited with a solid line. When a switch or a transistor functioning as a switch is in the OFF state (non-conductive state), there is no solid line between two nodes that are connected to each other by the switch or the transistor. Thus, in FIG. 6B and other drawings, the representation of a circuit is simplified.

Referring to FIG. 6B, the gate voltage and the source voltage of the second amplification Tr 205 are the same. Accordingly, the second amplification Tr 205 is in the OFF state, and the second source follower circuit is in the inactive state. On the other hand, the first amplification Tr 104 is in the ON state, and the first source follower circuit is in the active state. The first source follower circuit amplifies a signal corresponding to a reset voltage applied to the gate of the first amplification Tr 104 and outputs the amplified signal to the output signal line 110. At that time, the DAC 700 supplies a GND potential to the node VSEL.

Figure 6C:
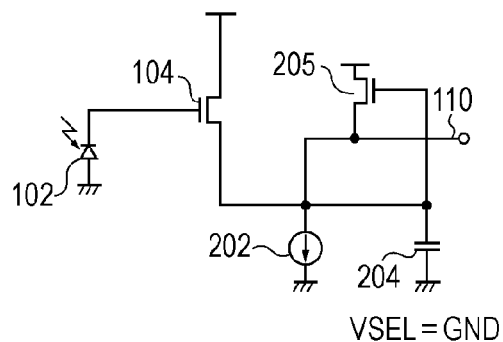

In a period RES_SH1, a noise signal is sampled in the intermediate capacitor 204. FIG. 6C is a diagram illustrating the connection state of the circuit illustrated in FIG. 6A in the period RES_SH1. In this period, the second amplification Tr 205 is also in the OFF state, and the first amplification Tr 104 is also in the ON state. That is, the first source follower circuit is in the active state, and the second source follower circuit is in the inactive state. Since the DAC 700 supplies a GND potential to the node VSEL, a noise signal is sampled in the intermediate capacitor 204 on the basis of the GND potential.

Figure 6D:
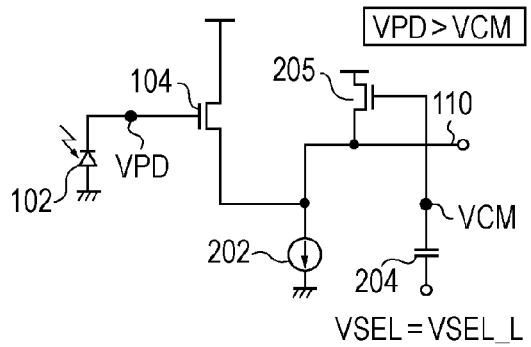

In a period HSCAN1, an electric charge is stored in a photoelectric conversion unit. FIG. 6D is a diagram illustrating the connection state of the circuit illustrated in FIG. 6A in the period HSCAN1. In FIG. 6D, VPD represents the gate potential of the first amplification Tr 104, and VCM represents the gate potential of the second amplification Tr 205. In the period HSCAN1 illustrated in FIG. 4, the DAC 700 outputs a reference voltage VSEL_L to the node VSEL. The reference voltage VSEL_L maintains the relationship of VPD>VCM even if VPD is reduced by an electric charge generated by photoelectric conversion. The voltage of the output signal line 110 therefore becomes a voltage corresponding to the gate voltage of the first amplification Tr 104. Since the gate voltage of the second amplification Tr 205 is lower than the source voltage of the second amplification Tr 205, the second amplification Tr 205 is in the OFF state. That is, like in the period RES_SH1, the second source follower circuit is in the inactive state and the first source follower circuit is in the active state.

Figure 6E:
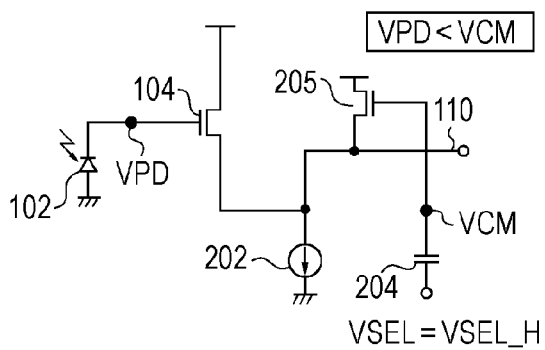

In a period SHN, the DAC 700 outputs to the node VSEL a reference voltage VSEL_H with which the relationship of VPD<VCM is maintained. FIG. 6E is a diagram illustrating the connection state of the circuit illustrated in FIG. 6A in the period SHN. In FIG. 6E, since the relationship of VPD<VCM is maintained, a voltage corresponding to the gate voltage of the second amplification Tr 205 is output to the output signal line 110. Since the source voltage of the first amplification Tr 104 is higher than the gate voltage of the first amplification Tr 104, the first amplification Tr 104 is in the OFF state. Accordingly, the second source follower circuit including the second amplification Tr 205 and the current source 202 amplifies the noise signal stored in the intermediate capacitor 204 and outputs the amplified noise signal.

In a period LIGHT_SH, a photoelectric conversion signal is sampled in the intermediate capacitor 204. At that time, like in the period RES_SH1, the connection state of the circuit illustrated in FIG. 6A is as illustrated in FIG. 6C. That is, the second amplification Tr 205 is in the OFF state.

In a period SHS, the DAC 700 outputs to the node VSEL the reference voltage VSEL_H with which the relationship of VPD<VCM is maintained. The connection state of the circuit illustrated in FIG. 6A is as illustrated in FIG. 6E again. Since the second amplification Tr 205 is turned on, the second source follower circuit is brought into the active state and the photoelectric conversion signal stored in the intermediate capacitor 204 is output.

When the second source follower circuit outputs a photoelectric conversion signal and a noise signal, the DAC 700 outputs the same reference voltage VSEL_H. Accordingly, the signal values of the photoelectric conversion signal and the noise signal are determined on the basis of the same reference voltage.

In periods RESET2 and RES_SH2, a reset operation and a noise signal sampling operation are performed.

As described previously, in this embodiment, by controlling a reference potential for the intermediate capacitor 204, either the first source follower circuit or the second source follower circuit is in the active state when a sampling operation is performed on the intermediate capacitor 204 and a signal stored in the intermediate capacitor 204 is output. Accordingly, the current source 202 can be shared by the first amplification Tr 104 and the second amplification Tr 205, and the number of current sources can be reduced. This leads to the reduction in power consumption.

In this embodiment, since the selection Tr 105 is not needed, the number of transistors in a pixel can be reduced. It is therefore possible to suppress the effect of desensitization of a photoelectric conversion unit caused by the reduction in the area of the photoelectric conversion unit.

In this embodiment, as a reference voltage output circuit for generating a reference voltage to be supplied to the node VSEL, the DAC 700 is used. However, for example, a circuit capable of selecting a desired voltage using a plurality of switches may be used.

In this embodiment, a reference potential for the intermediate capacitor 204 is transitionally changed so as to switch between the ON state and the OFF state of each of the first amplification Tr 104 and the second amplification Tr 205. However, for example, in order to switch between the ON state and the OFF state of each of the first amplification Tr 104 and the second amplification Tr 205, the value of a voltage to be applied to the gate of the first amplification Tr 104 may be transitionally controlled or the drain voltage of the first amplification Tr 104 or the second amplification Tr 205 may be controlled.

Since a reference potential for the intermediate capacitor 204 is transitionally changed, both the first source follower circuit and the second source follower circuit may be temporarily in the active state. A selection unit may have a configuration capable of bringing a first amplification unit and a second amplification unit into the above-described state.

Third Embodiment

Figure 7:
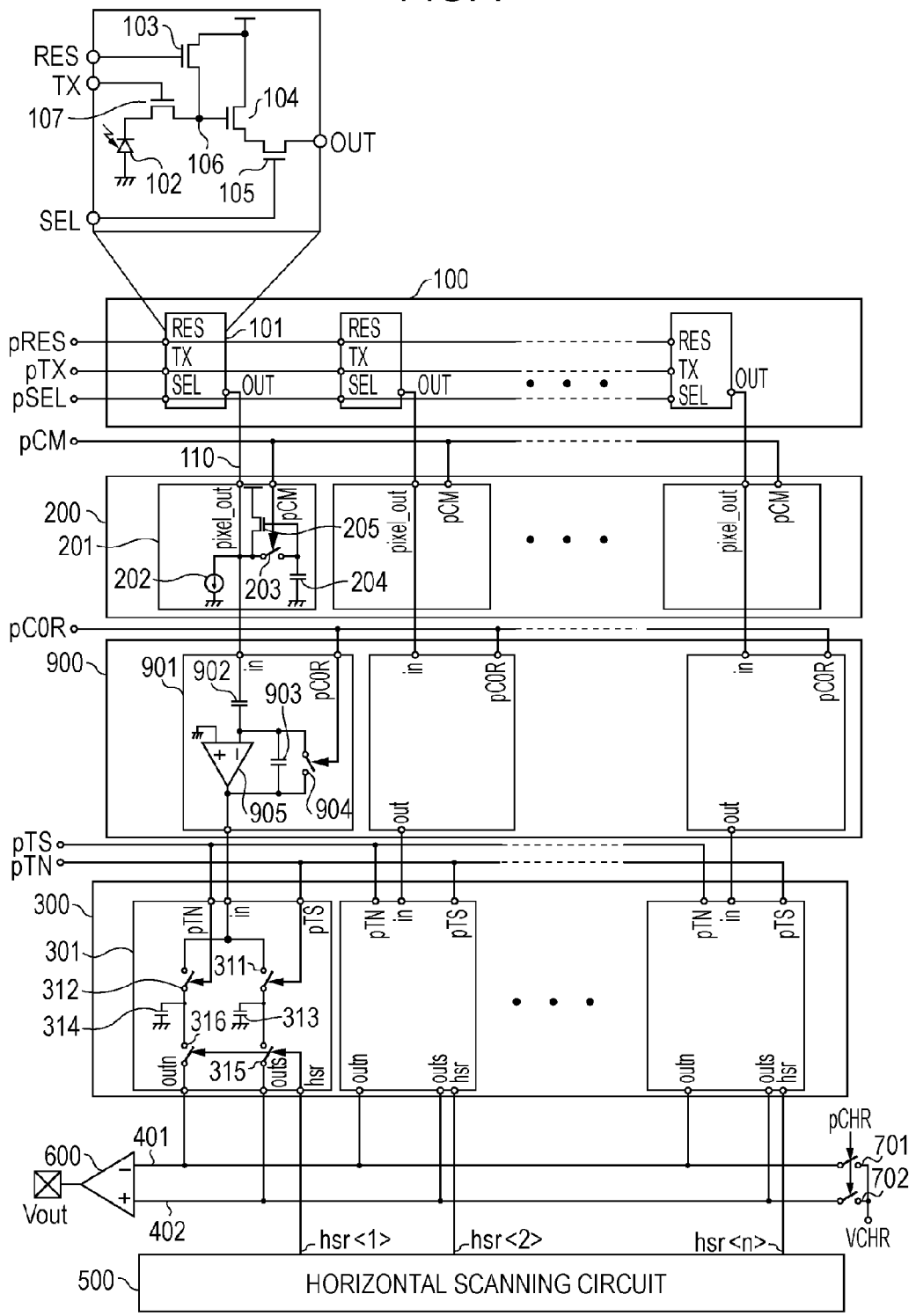
FIG. 7 is a schematic diagram of a system according to a third embodiment of the present invention.

FIG. 7 is a block diagram of a system according to the third embodiment. The same reference numerals are used to identify parts already described in the first embodiment, and the description thereof will be therefore omitted.

The difference between the third embodiment and the first embodiment is the configuration of the pixel 101. The gate of the first amplification Tr 104 is connected to a floating diffusion (FD) 106. A transfer transistor (Tr) 107 is disposed between the PD 102 and the FD 106.

A node TX is connected to the gate of the transfer Tr 107, and a transfer pulse pTX is input into the transfer Tr 107. The operation of the transfer Tr 107 is controlled by the transfer pulse pTX. When the transfer Tr 107 is brought into the conductive state, an electric charge stored in the PD 102 is depletion-transferred to the FD 106. An electric charge is to be completely depletion-transferred from the PD 102 to the FD 106.

A column amplification unit 901 is disposed between the column circuit block 201 and the storage unit 301. A column amplifier array 900 includes N column amplification units 901 that are one-dimensionally arranged. Each of the column amplification units 901 includes a clamp capacitor 902, a feedback capacitor 903, a reset switch 904, and an operational amplifier 905.

One end of the clamp capacitor 902 is connected to the output signal line 110, and the other end of the clamp capacitor 902 is connected to an inverting input node of the operational amplifier 905. One end of the feedback capacitor 903 is connected to the inverting input node of the operational amplifier 905, and the other end of the feedback capacitor 903 is connected to an output node of the operational amplifier 905. The reset switch 904 is disposed so that it is parallel to the feedback capacitor 903. The reset switch 904 is controlled by a pulse input into a node pC0R. A non-inverting input node of the operational amplifier 905 is connected to a GND potential.

In the circuit illustrated in FIG. 7, the feedback capacitor 903 is formed of only one capacitor. However, in the feedback capacitor 903, a plurality of capacitors may be disposed in parallel to one another, and a switch connected in series to each of the capacitors may be disposed. By disposing sets of a capacitor and a switch in parallel to one another in the feedback capacitor 903, it is possible to switch between gains in the column amplification unit 901.

Although not illustrated, a current source for supplying a bias current to the operational amplifier 905 is disposed in addition to the current source 202. That is, the operational amplifier 905 does not share a current source with both the first source follower circuit and the second source follower circuit. The operational amplifier 905 corresponds to a third amplification unit according to an embodiment of the present invention.

Figure 8:
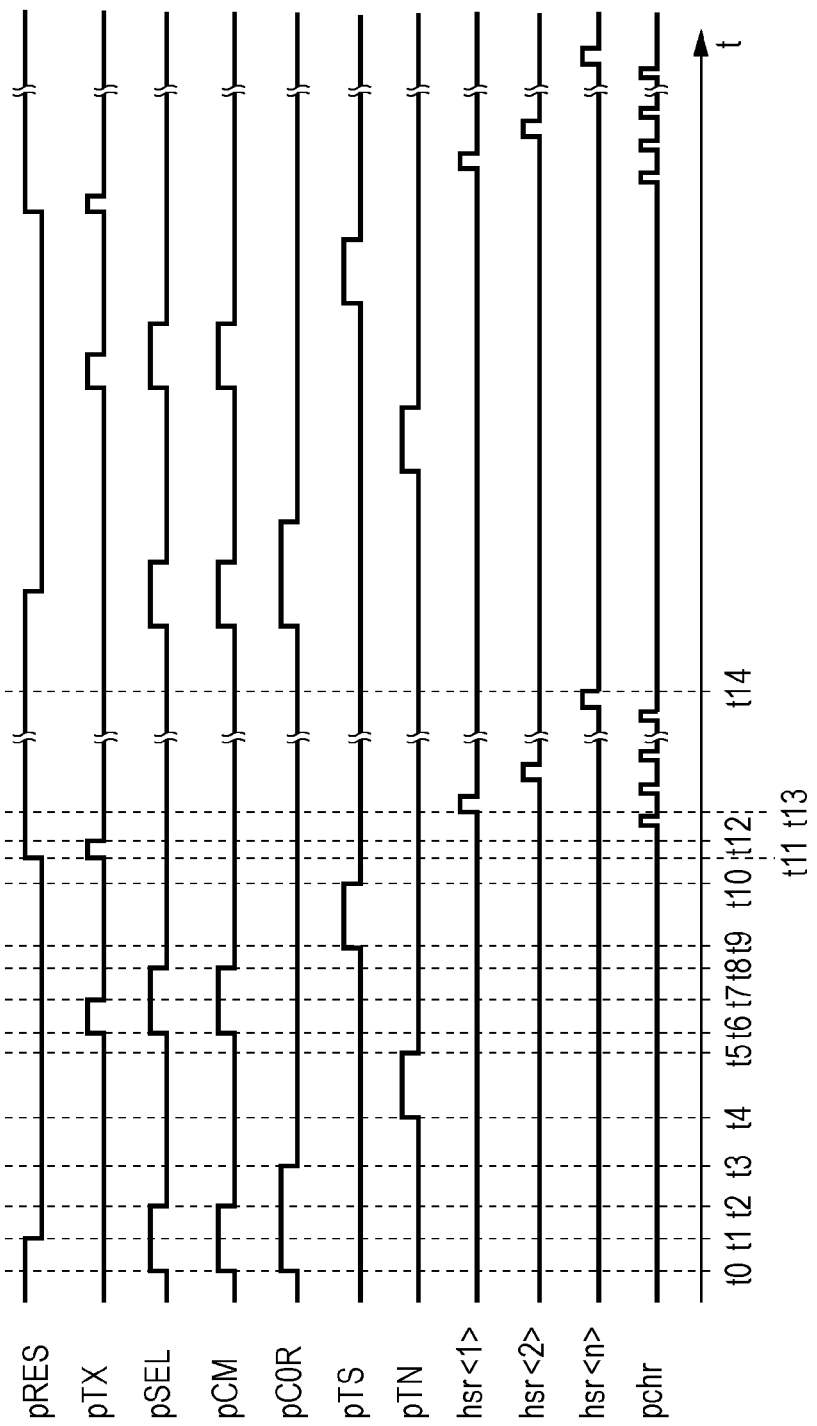
FIG. 8 is a timing chart illustrating the operation of a solid-state image pickup apparatus illustrated in FIG. 7.

FIG. 8 is a timing chart illustrating the operation of the circuit illustrated in FIG. 7. The operation of the circuit illustrated in FIG. 7 will be described in detail with reference to the timing chart illustrated in FIG. 8. When each pulse is at a high level, a corresponding switch is turned on. It is assumed that the PD 102 has already performed light storage.

Referring to FIG. 8, in a period between t0 and t1, pulses of levels at which corresponding transistors are turned on are individually input into the nodes RES, SEL, pCM, and pC0R. As a result, the potential of the FD 106 is reset.

In a period between t1 and t2, a pulse of a level at which the reset Tr 103 is turned off is input into the node RES. A noise component caused by the turning off of the reset Tr 103 is superimposed on a reset voltage for the FD 106. At that time, a noise signal output from the first source follower circuit is sampled in the intermediate capacitor 204. Since the source and the gate of the second source follower circuit are short-circuited, the second source follower circuit is in the inactive state.

In a period between t2 and t3, pulses of levels at which corresponding transistors are turned off are individually input into the nodes SEL and pCM. As a result, the second source follower circuit is brought into the active state. The noise signal stored in the intermediate capacitor 204 is amplified by the second source follower circuit and is then sampled in the clamp capacitor 902. Since the selection Tr 105 is in the OFF state, the first source follower circuit is in the inactive state.

In a period between t4 and t5, a pulse of a level at which the Ct control switch 312 is turned on is input into the node pTN. As a result, a noise signal is stored in the Ctn 314.

In a period between t6 and t7, pulses of levels at which corresponding switches are turned on are individually input into the nodes TX, SEL and pCM. Since the transfer Tr 107 is brought into conduction, a signal electric charge stored in the PD 102 is transferred to the FD 106. After this period has elapsed, a light storage period ends.

In a period between t7 and t8, the transfer Tr 107 is turned off and a photoelectric conversion signal corresponding to the amount of electric charge transferred to the FD 106 is sampled in the intermediate capacitor 204. At that time, the first source follower circuit is in the active state and the second source follower circuit is in the inactive state.

In a period between t8 and t9, pulses of levels at which corresponding switches are turned off are individually input into the nodes SEL and pCM. As a result, the second source follower circuit is brought into the active state and the difference between a noise signal and the photoelectric conversion signal stored in the intermediate capacitor 204 is stored in the clamp capacitor 902.

In a period between t9 and t10, a pulse of a level at which the Ct control switch 311 is turned on is input into the node pTS. As a result, a photoelectric conversion signal is sampled in the Cts 313.

In a period between t11 and t12, pulses of levels at which corresponding transistors are turned on are individually input into the nodes TX and RES. As a result, the reset Tr 103 and the transfer Tr 107 are brought into conduction and the potentials of the PD 102 and the FD 106 are reset. A pulse of a level at which the transfer Tr 107 is turned off is input into the node TX at the end of this period, and a light storage period starts.

In a period between t13 and t14, the photoelectric conversion signal sampled in the Cts 313 and the noise signal sampled in the Ctn 314 are transmitted to the horizontal output lines 402 and 401, respectively. The difference between the photoelectric conversion signal and the noise signal is obtained by the output amplifier 600 and is output from the output amplifier 600.

In this embodiment, when the second source follower circuit writes a noise signal stored in the intermediate capacitor into the clamp capacitor 902, the node of the clamp capacitor 902 on the side of the operational amplifier 905 is set to the GND potential using the amplification function of the operational amplifier 905 in the column amplification unit 901. Thus, an operational amplifier is operated when a signal is clamped in a clamp capacitor. That is, in this embodiment, the column amplification unit 901 operates as an amplification circuit when the first source follower circuit or the second source follower circuit is in the active state. Accordingly, the operational amplifier 905 included in the column amplification unit 901 does not share a current source with the first source follower circuit and the second source follower circuit.

In this embodiment, the following effect can be obtained in addition to the effect that can be obtained in the first embodiment. In this embodiment, the pixel 101 includes the transfer Tr 107. Since the transfer Tr 107 can electrically disconnect the PD 102 from the FD 106, the PD 102 can store light in a state in which the potential of the FD 106 is maintained at a reset potential. Using this configuration, it is possible to reduce a time interval between sampling of a noise signal in the intermediate capacitor 204 and sampling of a photoelectric conversion signal in the intermediate capacitor 204. This leads to the reduction in the effect of 1/f noise.

A system according to this embodiment includes the column amplification unit 901 including the clamp capacitor 902. Using this configuration, it is possible to reduce noise caused by variations of characteristics of the pixel 101 and the column circuit block 201.

In this embodiment, the storage unit 301 is disposed at a stage subsequent to the column amplification unit 901. Using this configuration, it is possible to reduce noise caused by variations of characteristic of the column amplification unit 901.

Exemplary Modification of Third Embodiment

Figure 9:
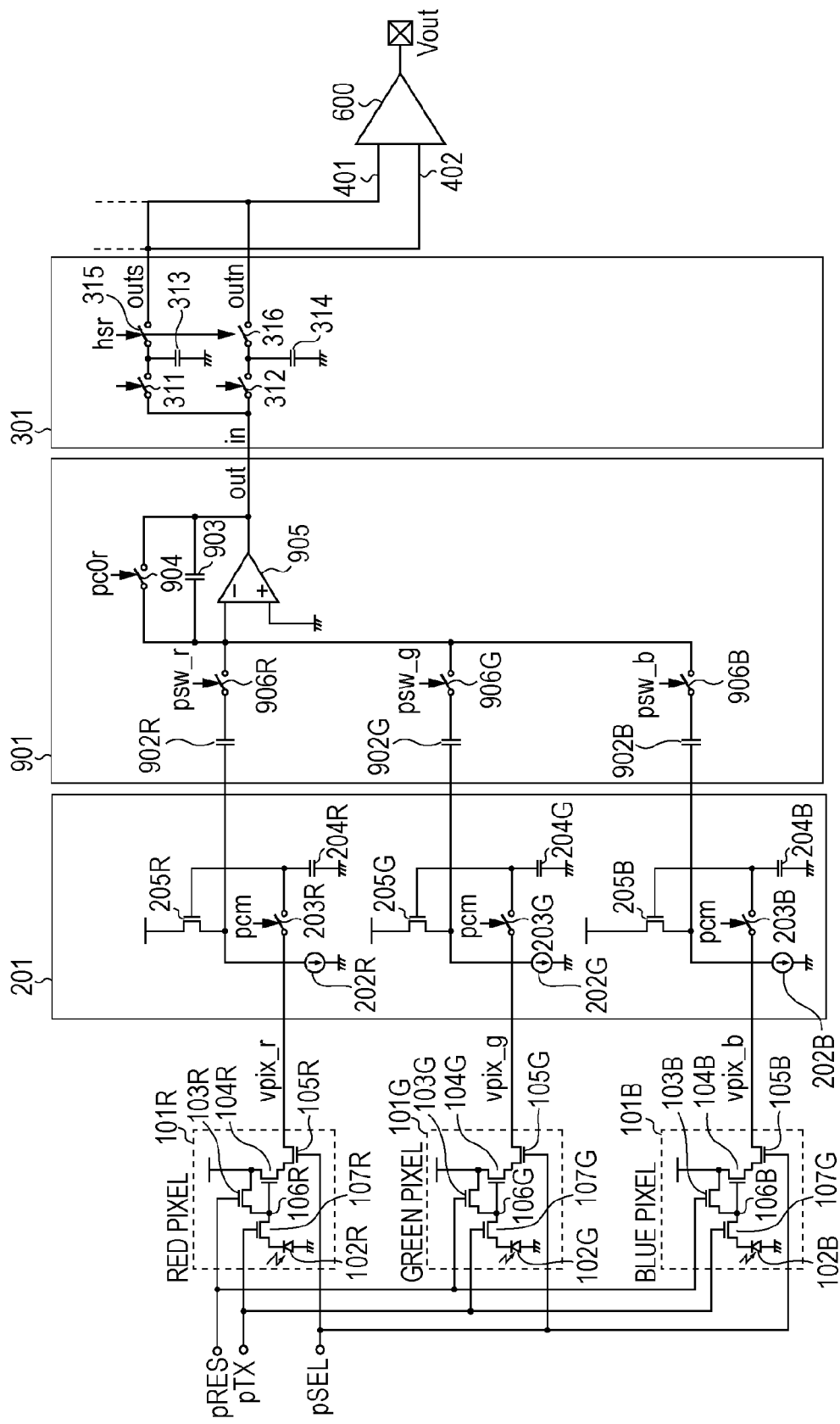
FIG. 9 is a schematic diagram of a system that is an exemplary modification of the third embodiment.

FIG. 9 is a diagram illustrating an exemplary modification of a system according to the third embodiment. The same reference numerals are used to identify parts already described in the third embodiment, and the description thereof will be therefore omitted.

Pixel arrays 100R, 100G, and 100B are disposed in three rows. For example, the pixel arrays 100R, 100G, and 100B may output signals corresponding to red, green, blue lights, respectively. In FIG. 9, only three pixels in a single column, pixels 101R, 101G, and 101B, are illustrated. However, a plurality of pixel columns may be disposed so as to achieve parallel reading.

The column circuit block 201 and the clamp capacitor 902 are disposed for each pixel. The correspondence between a pixel and a component is represented by R, G, or B at the end of a numeral. The column circuit block 201 may be shared by some pixels. For example, the column circuit block 201 may be shared by a pixel 101M used for monochrome image capturing and the pixel 101R corresponding to red light.

The reset Trs 103R, 103G, and 103B in pixels are controlled by a common pulse. Selection Trs in pixels are similarly controlled by a common pulse. Transfer Trs in pixels are similarly controlled by a common pulse. S/H switches in column circuit blocks are similarly controlled by a common pulse.

Column amplification switches 906R, 906G, and 906B are disposed on paths between the clamp capacitors 902R, 902G, and 902B and the inverting input terminal of the operational amplifier 905, respectively. The conductive states of the column amplification switch 906R, 906G, and 906B are controlled by pulses psw_r, psw_g, and psw_b, respectively.

Figure 10:
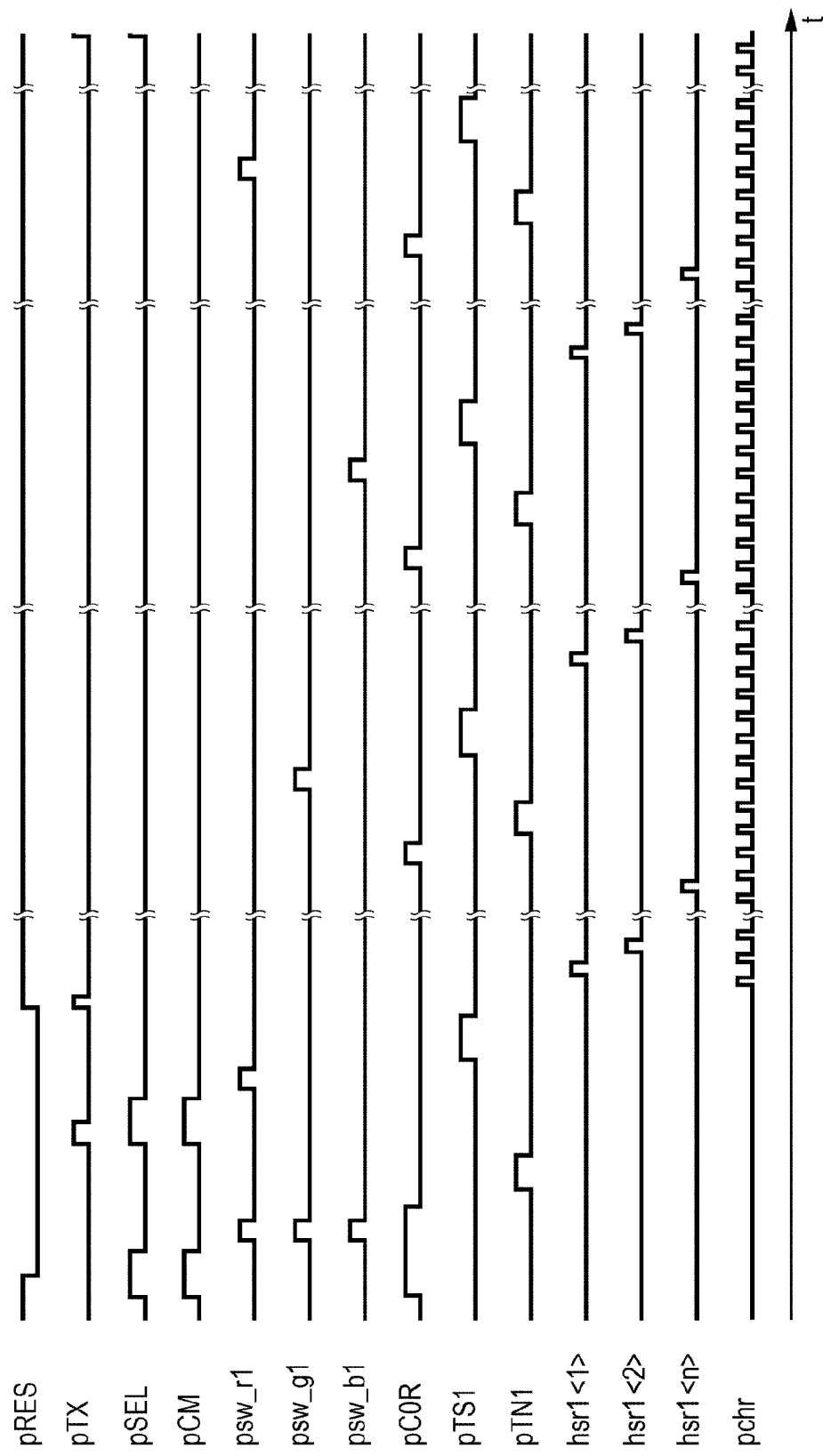
FIG. 10 is a timing chart illustrating the operation of a solid-state image pickup apparatus illustrated in FIG. 9.

FIG. 10 is a timing chart illustrating the operation of the circuit illustrated in FIG. 9. The operation of the circuit illustrated in FIG. 9 will be described in detail with reference to the timing chart illustrated in FIG. 10. It is assumed that light storage has already started in a photoelectric conversion unit.

After the reset Trs have been turned off and noise signals have been written in the intermediate capacitors, pulses of levels at which corresponding switches are turned on are individually input into the column amplification switches 906R, 906G, and 906B. The noise signals of pixels written in the intermediate capacitors are individually clamped in clamp capacitors at the same time. At that time, the potentials of the nodes of the clamp capacitors on the side of the operational amplifier 905 are set to the GND potential.

After the reset switch 904 has been turned off, a pulse of a level at which the Ct control switch 312 is turned on is input and the offset component of the operational amplifier 905 is written in the Ctn 314.

A pulse of a level at which the transfer Trs are turned on is input into the node TX, and signal electric charges generated in pixels in the light storage period are individually transferred to the FDs at the same time. When the transfer Trs are turned off, the light storage period ends.

After the signal electric charges have been transferred to the FDs, the pulse psw_r of a level at which the column amplification switch 906R is turned on is input. As a result, the photoelectric conversion signal of the pixel 101R is clamped in the clamp capacitor 902R. Subsequently, a pulse of a level at which the Ct control switch 311 is turned on is input, and the photoelectric conversion signal of the pixel 101R is written in the Cts 313. The signals written in the Cts 313 and the Ctn 314 are individually transmitted to the horizontal output lines. The output amplifier 600 outputs a signal that does not include the offset component of the column amplifier.

Subsequently, a pulse of a level at which the reset switch 904 is turned on is input, and the potential of the output node of the operational amplifier 905 is set to the GND potential. After the operational amplifier 905 has been reset, a pulse of a level at which the Ct control switch 312 is turned on is input and the offset component of the operational amplifier 905 is written in the Ctn 314.

Subsequently, the pulse psw_g of a level at which the column amplification switch 906G is turned on is input. As a result, the photoelectric conversion signal of the pixel 101G is clamped in the clamp capacitor 902G. Subsequently, the Ct control switch 311 is brought into conduction, and the photoelectric conversion signal of the pixel 101G is written in the Cts 313. Signals are individually transmitted to the horizontal output lines, and the output amplifier 600 obtains the difference between these signals.

After the offset component of the operational amplifier 905 has been read, like the photoelectric conversion signals of the pixels 101R and 101G, the photoelectric conversion signal of the pixel 101B is read.

The following effect can be obtained in addition to the effect that can be obtained in the third embodiment. In this exemplary modification of the third embodiment, after all pixels have been reset at the same time, photoelectric conversion signals of these pixels can be individually written in the intermediate capacitors at the same time. Using this configuration, it is possible to set the same light storage period in all pixels even if the pixels are arranged in a plurality of rows.

Fourth Embodiment

Figure 11:
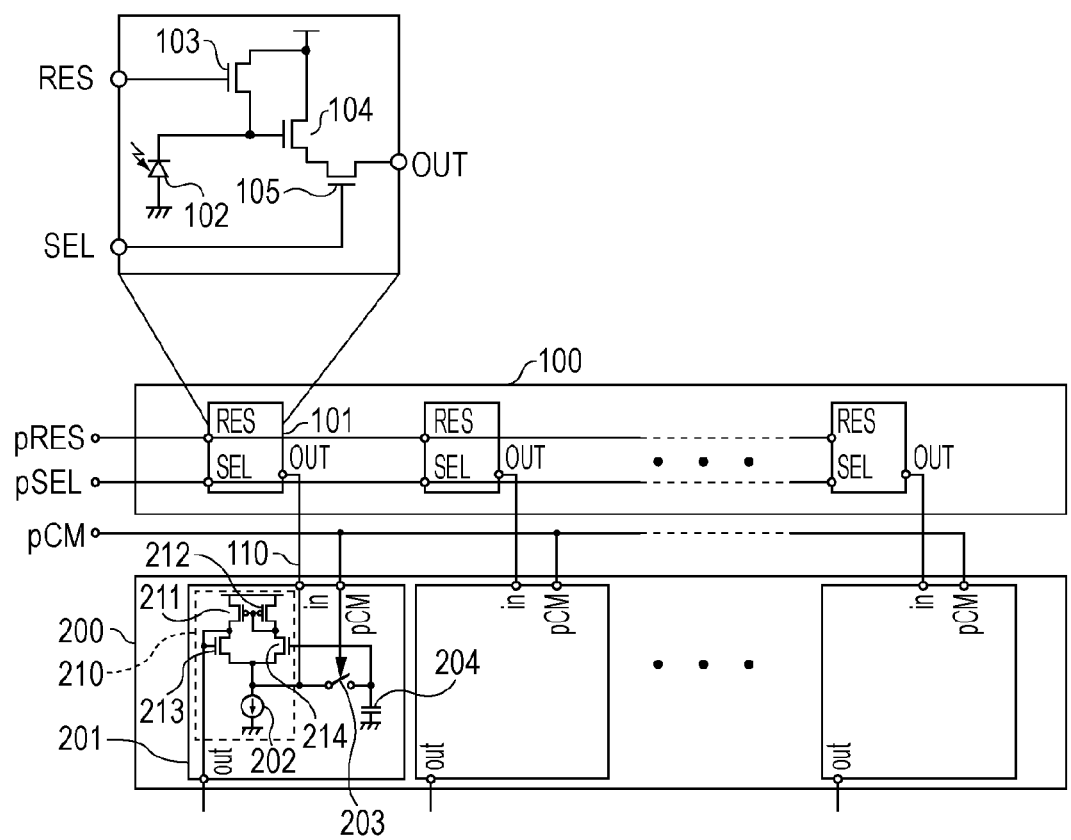
FIG. 11 is a schematic diagram of a system according to a fourth embodiment of the present invention.

FIG. 11 is a block diagram of a system according to the fourth embodiment. The same reference numerals are used to identify parts already described in the first to third embodiments, and the description thereof will be therefore omitted.

In this embodiment, a voltage follower circuit is disposed instead of a second source follower circuit according to the first embodiment. More specifically, a differential amplification circuit including two PMOS transistors (Trs) 211 and 212 and two NMOS transistors (Trs) 213 and 214 is disposed instead of the second amplification Tr 205 according to the first embodiment. The PMOS Trs 211 and 212, the NMOS Trs 213 and 214, and the current source 202 form an operational amplifier 210.

When the S/H switch 203 is in the ON state, the potentials of the gate and the source of the NMOS Tr 214 are the same. Since no current passes through the operational amplifier 210, the voltage follower circuit is in the inactive state. When the selection Tr 105 is in the ON state, the first source follower circuit in the active state amplifies a signal of a pixel and outputs the amplified signal to the intermediate capacitor 204.

When the selection Tr 105 and the S/H switch 203 are in the OFF state, the first source follower circuit is in the inactive state. On the other hand, the voltage follower circuit in the active state amplifies a signal stored in the intermediate capacitor 204 and outputs the amplified signal. When the selection Tr 105 and the S/H switch 203 are turned off, the S/H switch 203 is turned off first.

In this embodiment, the selection Tr 105 and the S/H switch 203 correspond to a selection unit according to an embodiment of the present invention.

In this embodiment, a voltage follower circuit is used as a second amplification unit. Using this configuration, the following effect can be obtained in addition to the effect that can be obtained in the first embodiment. The gain of a voltage follower circuit using an operational amplifier is close to 1. Accordingly, it is possible to improve a linear relationship between an input and an output and achieve image capturing of a high-quality image.

In this embodiment, a configuration according to the second or third embodiment may be employed.

Fifth Embodiment

Figure 12:
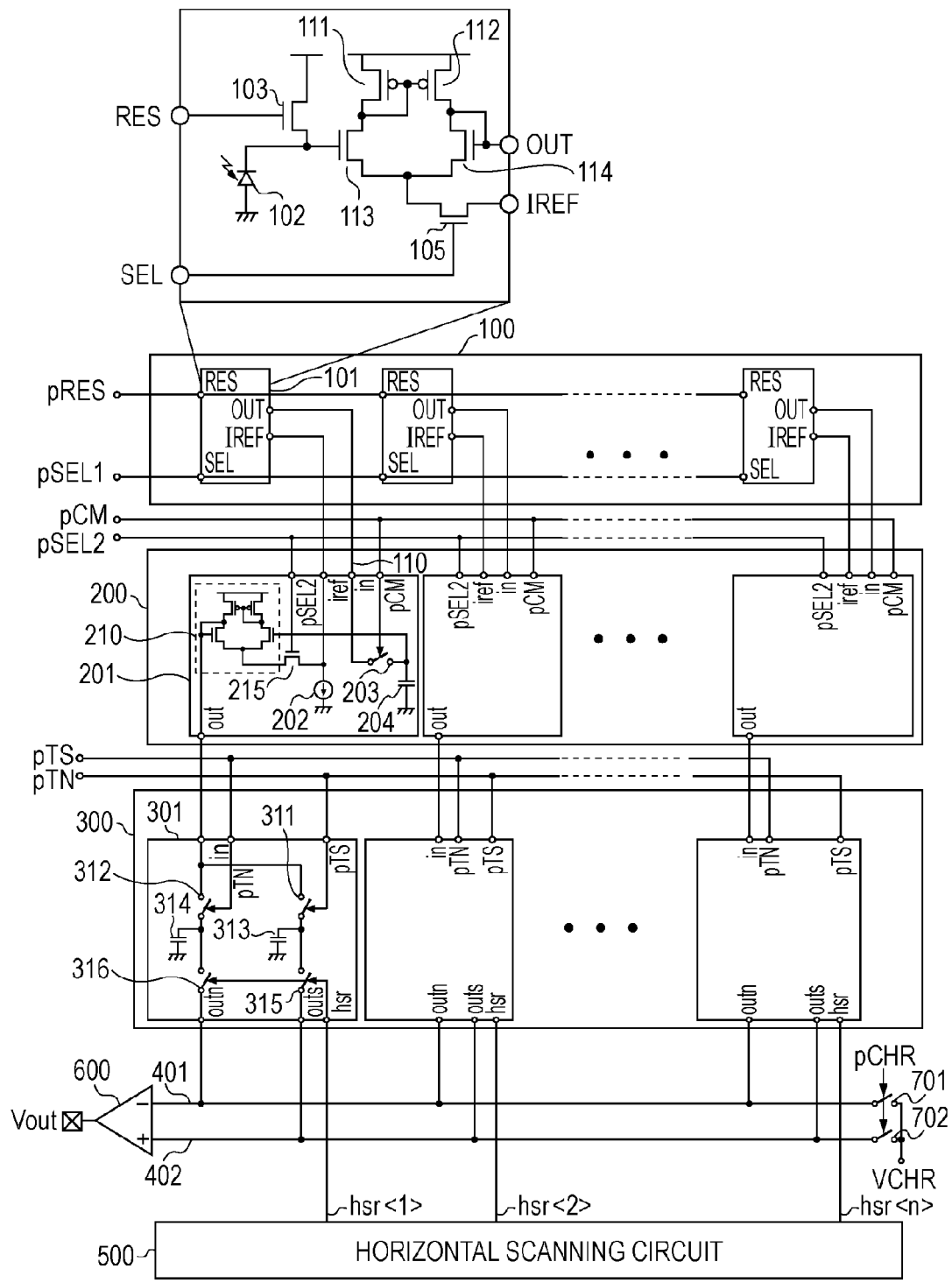
FIG. 12 is a schematic diagram of a system according to a fifth embodiment of the present invention.

FIG. 12 is a block diagram of a system according to the fifth embodiment. The same reference numerals are used to identify parts already described in the first to fourth embodiments, and the description thereof will be therefore omitted.

The difference between the fifth embodiment and the first embodiment is that a first voltage follower circuit and a second voltage follower circuit are disposed instead of the first source follower circuit and the second source follower circuit, respectively. Instead of the first amplification Tr 104 in the pixel 101, a first differential amplification circuit including two PMOS transistors 111 and 112 and two NMOS transistors 113 and 114 is disposed. The first differential amplification circuit is connected to the current source 202 via the selection Tr 105. The first differential amplification circuit and the current source 202 form the first voltage follower circuit.

A second differential amplification circuit including the PMOS Trs 211 and 212 and the NMOS Trs 213 and 214 is connected to the current source 202 via a selection transistor (Tr) 215. The second differential amplification circuit and the current source 202 form the second voltage follower circuit.

In this embodiment, switching between the active state and the inactive state of the first voltage follower circuit is performed by switching between the ON state and the OFF state of the selection Tr 105, and switching between the active state and the inactive state of the second voltage follower circuit is performed by switching between the ON state and the OFF state of the selection Tr 215. The selection Trs 105 and 215 correspond to a selection unit according to an embodiment of the present invention.

Using this configuration, it is possible to further improve a linear relationship between an input and an output since two amplification units are individually formed of voltage follower circuits. This leads to the increase in image quality.

In the fourth and fifth embodiments, a voltage follower circuit including an operational amplifier is used. However, instead of a voltage follower circuit, an amplification circuit having a voltage gain higher than 1 may be used.

In the first to fifth embodiments, an electron is equivalent to a signal electric charge. However, a hole may be equivalent to a signal electric charge. In this case, the polarity of the PD 102 and the conductivity type of each transistor are reversed. For example, in the second embodiment, even if a photodiode whose polarity is opposite to that of the PD 102 illustrated in FIG. 3 is used, it is possible to respond to the change of a photodiode by adjusting the voltage condition of the node VSEL.

In the first to fifth embodiments, a signal is amplified by amplification units at two stages. However, a signal may be amplified by amplification units at more than two stages and a current source may be shared by these amplification units as appropriate.

In the first to fifth embodiments, for the simplification of explanation, a line sensor with a pixel array of 1 row by N columns has been described. However, an embodiment of the present invention may be applied to an area sensor with a two-dimensional pixel array.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-039070 filed Feb. 24, 2010, which is hereby incorporated by reference herein in its entirety.

What is claimed is:

1. An apparatus comprising:
   a conversion unit configured to generate electric charge;
   a first amplification unit configured to amplify a signal corresponding to an amount of the electric charge and output a first amplified signal;
   a second amplification unit configured to amplify the first amplified signal and output a second amplified signal;
   a current source shared by the first and second amplification units and configured to provide a current bias for each of the first and the second amplification units;
   a selection unit configured to separately bring the first amplification unit and the second amplification unit into an inactive state; and
   a switch unit configured to control an electric connection between a first output node of the first amplification unit and a second input node of the second amplification unit.

2. The apparatus according to claim 1, further comprising:
   a storage unit that is disposed on a path between the switch unit and the second input node and is configured to store the first amplified signal or a signal based on the first amplified signal,
   wherein the storage unit includes a capacitor, and
   wherein a first node of the capacitor is connected to the path between the switch unit and the second input node and a second node of the capacitor is connected to a node provided with a reference voltage.

3. The apparatus according to claim 2, further comprising an output signal line, and
   wherein the first output node is electrically connected to the output signal line,
   wherein the output signal line is electrically connected to the second input node via the switch unit,
   wherein a second output node of the second amplification unit is electrically connected to the output signal line, and
   wherein the current source is electrically connected to the output signal line.

4. The apparatus according to claim 3, further comprising a power line configured to supply a bias voltage to the first amplification unit, and
   wherein the first amplification unit includes a first amplification MOS transistor,
   wherein a first gate of the first amplification MOS transistor is a first input node of the first amplification unit, and a source of the first amplification MOS transistor is the first output node, and a drain of the first amplification MOS transistor is electrically connected to the power line, and
   wherein a selection transistor is disposed on a path between the first drain and the power line or a path between the first source and the output signal line.

5. The apparatus according to claim 1, further comprising an output circuit configured to output a plurality of reference voltages, and
   wherein the first amplification unit includes a first amplification transistor,
   wherein the second amplification unit includes a second amplification transistor, and
   wherein the output circuit controls a bias state of at least one of the first amplification transistor and the second amplification transistor.

6. The apparatus according to claim 1, further comprising:
   a reset unit configured to reset a voltage at a first input node of the first amplification unit; and
   a differential operation unit, and
   wherein the first amplification unit amplifies a signal corresponding to a voltage at the first input node in a state in which the first input node is reset and outputs a third amplified signal,
   wherein the second amplification unit amplifies the third amplified signal and outputs a fourth amplified signal, and
   wherein the differential operation unit is configured to output a difference signal corresponding to a difference between the second amplified signal and the fourth amplified signal.

7. The apparatus according to claim 6, wherein the second amplified signal and the fourth amplified signal include noise components that are correlated with each other.

8. The apparatus according to claim 1, further comprising:
   a floating diffusion that is electrically connected to a first input node of the first amplification unit; and
   a transfer unit configured to transfer the electric charge to the floating diffusion.

9. The apparatus according to claim 1, further comprising a plurality of sets of the conversion unit, the first amplification unit, the second amplification unit, and the current source.

10. The according to claim 1, further comprising a third amplification unit at a stage subsequent to the second amplification unit, and
    wherein the third amplification unit does not share the current source with the first amplification unit and the second amplification unit.

11. The apparatus according to claim 1, wherein the selection unit brings the first amplification unit and the second amplification unit into the inactive state at a same time.

12. The apparatus according to claim 1, wherein the first amplification unit and the second amplification unit are source follower circuits.

13. A method for an apparatus that includes a conversion unit configured to generate electric charge, a first amplification unit configured to amplify a signal corresponding to an amount of the electric charge and output a first amplified signal, a second amplification unit configured to amplify the first amplified signal and output a second amplified signal, a current source shared by the first and second amplification units and configured to provide a current bias for each of the first and the second amplification units, a selection unit configured to bring the first amplification unit and the second amplification unit into an inactive state, and a switch unit configured to control an electric connection between a first output node of the first amplification unit and a second input node of the second amplification unit, the method comprising:

bringing the second amplification unit into the inactive state while the first amplification unit into an active state by turning on the switch unit so as to connect the first output node of the first amplification unit and the second input node of the second amplification unit; and bringing the first amplification unit into the inactive state while the second amplification unit into the active state by turning off the switch unit so as to disconnect the first output node of the first amplification unit and the second input node of the second amplification unit.

14. The method according to claim 13, wherein the apparatus further includes:

a storage unit that is disposed on a path between the switch unit and the second input node and is configured to store the first amplified signal or a signal based on the first amplified signal, wherein the storage unit includes a capacitor, and wherein a first node of the capacitor is connected to the path between the switch unit and the second input node and a second node of the capacitor is connected to a node provided with a reference voltage.

15. The method according to claim 14, wherein the apparatus further includes an output signal line, wherein the first output node is electrically connected to the output signal line, wherein the output signal line is electrically connected to the second input node via the switch unit, wherein a second output node of the second amplification unit is electrically connected to the output signal line, and wherein the current source is electrically connected to the output signal line.

16. The method according to claim 15, wherein the apparatus further includes a power line configured to supply a bias voltage to the first amplification unit, wherein the first amplification unit includes a first amplification MOS transistor, wherein a first gate of the first amplification MOS transistor is a first input node of the first amplification unit, and a source of the first amplification MOS transistor is the first output node, and a drain of the first amplification MOS transistor is electrically connected to the power line, and wherein a selection transistor is disposed on a path between the first drain and the power line or a path between the first source and the output signal line.

17. The method according to claim 13, wherein the apparatus further includes an output circuit configured to output a plurality of reference voltages, wherein the first amplification unit includes a first amplification transistor, wherein the second amplification unit includes a second amplification transistor, and wherein the output circuit controls a bias state of at least one of the first amplification transistor and the second amplification transistor.

18. The method according to claim 13, wherein the apparatus further includes:

a reset unit configured to reset a voltage at a first input node of the first amplification unit; and a differential operation unit, wherein the first amplification unit amplifies a signal corresponding to a voltage at the first input node in a state in which the first input node is reset and outputs a third amplified signal, wherein the second amplification unit amplifies the third amplified signal and outputs a fourth amplified signal, and wherein the differential operation unit is configured to output a difference signal corresponding to a difference between the second amplified signal and the fourth amplified signal.

19. The method according to claim 13, wherein the apparatus further includes:

a floating diffusion that is electrically connected to the first input node; and a transfer unit configured to transfer the electric charge to the floating diffusion.

20. A method for an apparatus that includes a conversion unit configured to generate electric charge, a first amplification unit configured to amplify a signal corresponding to an amount of the electric charge and output a first amplified signal, a second amplification unit configured to amplify the first amplified signal and output a second amplified signal, a current source shared by the first amplification unit and the second amplification unit and configured to provide a current bias for each of the first and the second amplification units, a first amplification MOS transistor included in the first amplification unit, an output signal line, a switch unit, and a selection transistor, the output signal line being electrically connected to a source of the first amplification MOS transistor via the selection transistor, the switch unit being configured to control an electric connection between the output signal line and a second input node of the second amplification unit, a second output node of the second amplification unit being connected to the output signal line, the current source being connected to the output signal line, the method comprising:

bringing the second amplification unit into an inactive state while the first amplification unit into an active state by turning on the selection transistor and the switch unit; and bringing the first amplification unit into the inactive state while the second amplification unit into the active state by turning off the selection transistor and the switch unit.

* * * * *